United States Patent
Xu (10) Patent No.: US 9,215,642 B2
(45) Date of Patent: Dec. 15, 2015

(54) SERVICE PACKET FORWARDING AND PROCESSING METHOD AND SYSTEM, AND ACCESS POINT AP

(71) Applicant: Huawei Technologies Co., Ltd., Shenzhen (CN)

(72) Inventor: Yibin Xu, Nanjing (CN)

(73) Assignee: Huawei Technologies Co., LTD, Shenzhen (CN)

( * ) Notice: Subject to any disclaimer, the term of this patent is extended or adjusted under 35 U.S.C. 154(b) by 165 days.

(21) Appl. No.: 14/059,562

(22) Filed: Oct. 22, 2013

(65) Prior Publication Data

US 2014/0119358 A1 May 1, 2014

(30) Foreign Application Priority Data

Oct. 26, 2012 (CN) .......................... 2012 1 0417312

(51) Int. Cl.
*H04W 4/00* (2009.01)
*H04W 40/02* (2009.01)
*H04L 29/12* (2006.01)
*H04W 88/08* (2009.01)
*H04W 84/12* (2009.01)

(52) U.S. Cl.
CPC ............. *H04W 40/02* (2013.01); *H04L 61/103* (2013.01); *H04W 88/08* (2013.01); *H04L 61/2015* (2013.01); *H04W 84/12* (2013.01)

(58) Field of Classification Search
CPC ....................................................... H04W 40/02
USPC ........................... 370/328–339; 713/168–171
See application file for complete search history.

(56) References Cited

U.S. PATENT DOCUMENTS

2004/0103282 A1* 5/2004 Meier et al. .................... 713/171
2010/0039982 A1* 2/2010 Itagaki et al. .................. 370/315

FOREIGN PATENT DOCUMENTS

EP 2416527 A1 2/2012

* cited by examiner

*Primary Examiner* — Iqbal Zaidi
(74) *Attorney, Agent, or Firm* — Slater & Matsil, L.L.P.

(57) ABSTRACT

Embodiments of the present invention provide a service packet forwarding and processing method and system, and an access point AP. Change information of a packet forwarding path of a mobile terminal STA is obtained. A path update packet is sent to a forwarding device according to the change information of the packet forwarding path of the STA, so that the forwarding device performs update processing on the forwarding path of the STA according to the path update packet.

16 Claims, 3 Drawing Sheets

Obtain change information of a packet forwarding path of an STA — 100

Send a path update packet to a forwarding device according to the change information of the packet forwarding path of the STA, so that the forwarding device performs update processing on the forwarding path of the STA according to the path update packet — 102

(prior art)

SERVICE PACKET FORWARDING AND PROCESSING METHOD AND SYSTEM, AND ACCESS POINT AP

CROSS-REFERENCE TO RELATED APPLICATION

This application claims priority to Chinese Patent Application No. 201210417312.3, filed on Oct. 26, 2012, which is hereby incorporated by reference in its entirety.

TECHNICAL FIELD

Embodiments of the present invention relate to communications technologies, and in particular, to a service packet forwarding and processing method and system, and an access point AP.

BACKGROUND

Figure 1:
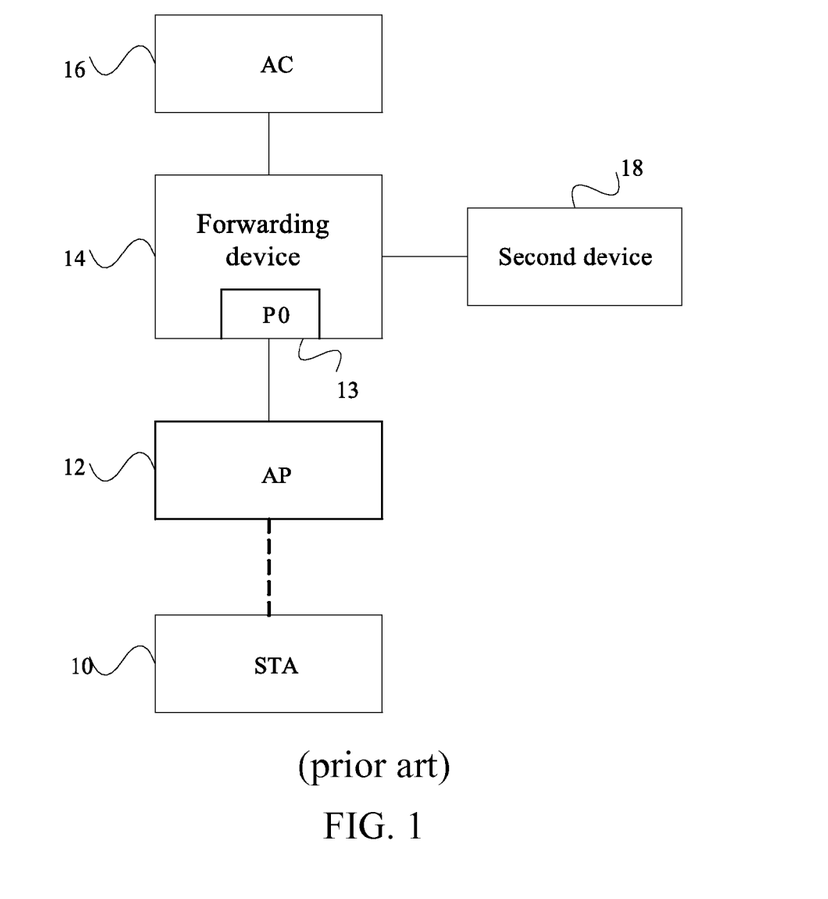
FIG. 1 is a schematic diagram of a network in the prior art where a mobile terminal communicates with a second device over a wireless local area network.

FIG. 1 is a schematic diagram of a network in the existing technology where a mobile terminal communicates with a second device over a wireless local area network. A mobile terminal (Station, abbreviated as STA) 10 is associated with an access point (abbreviated as AP) 12 for accessing a WLAN; a second device 18 may be connected to a forwarding device over a wired network or be directly connected to the forwarding device by using a network cable, where the second device may be a user terminal, for example, a personal computer, or a server in a network. In a wireless local area network (abbreviated as WLAN), a service packet may be forwarded in two manners, namely, local forwarding and tunnel forwarding, where the tunnel forwarding is also referred to as centralized forwarding.

In the case of the local forwarding manner, the STA 10 sends a service packet to the AP 12; the AP 12 converts the service packet into an Ethernet service packet and sends the Ethernet service packet to a port P0 13 of a forwarding device 14; the forwarding device 14 may learn, on the P0 13 port, an address of the STA 10, and sends the Ethernet service packet to the second device 18. If the second device 18 sends a service packet to the STA 10, the forwarding device 14 may send the service packet from the port P0 13 to the STA 10.

In the case of the tunnel forwarding manner, the STA 10 sends a service packet to the AP 12; the AP 12, after converting the service packet into an Ethernet service packet, needs to encapsulate the Ethernet service packet into a tunnel of Control and Provisioning of Wireless Access Points (abbreviated as CAPWAP); the forwarding device 14 sends the encapsulated service packet to an Access Controller (abbreviated as AC) 16; the AC 16 performs tunnel decapsulation to obtain the Ethernet service packet, and then sends the Ethernet service packet to the port P0 13 of the forwarding device 14. The forwarding device 14 may learn, on the port P0 13, an address of the STA 10, and sends the Ethernet service packet to the second device 18. If the second device 18 sends a service packet to the STA 10, the forwarding device 14 may send the service packet from the port P0 13 to the AC 16, thereby performing subsequent packet processing and transmission.

However, for either the local forwarding manner or the tunnel forwarding manner, because of a reason of a wireless side, for example, roaming of the STA, a switchover between active and standby ACs, and the like, a change may occur on a service packet forwarding path from the STA to the second device, thereby producing a problem that a service packet sent by the second device to the STA through a forwarding device cannot reach the STA, which results in low service forwarding efficiency, and reduces service reliability.

SUMMARY

With respect to the shortcoming of the prior art, the present invention provides a service path switching method, an access point device, and a forwarding device.

In one aspect, an embodiment of the present invention provides a service packet forwarding and processing method, including:

obtaining change information of a packet forwarding path of a mobile terminal STA; and sending a path update packet to a forwarding device according to the change information of the packet forwarding path of the STA, so that the forwarding device performs update processing on the packet forwarding path of the STA according to the path update packet.

In a second aspect, an embodiment of the present invention provides an access point AP, including:

an obtaining module, configured to obtain change information of a packet forwarding path of an STA; and a sending module, configured to send a path update packet to a forwarding device according to the change information of the packet forwarding path, so that the forwarding device performs update processing on the forwarding path of the STA according to the path update packet.

In a third aspect, an embodiment of the present invention provides a service forwarding and processing system, including the above AP and an AC, where the AC is configured to send a path switching notification packet or a roaming success notification packet to the AP.

According to the service forwarding and processing method and system, and the access point AP that are provided in the present invention, when a service forwarding path is switched, change information of a packet forwarding path of an STA is obtained by using an AP, an access point device sends a path update packet to a forwarding device according to the change information of the packet forwarding path, and the forwarding device performs update processing on the forwarding path of the STA according to the path update packet. This improves service forwarding efficiency, thereby ensuring service reliability.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
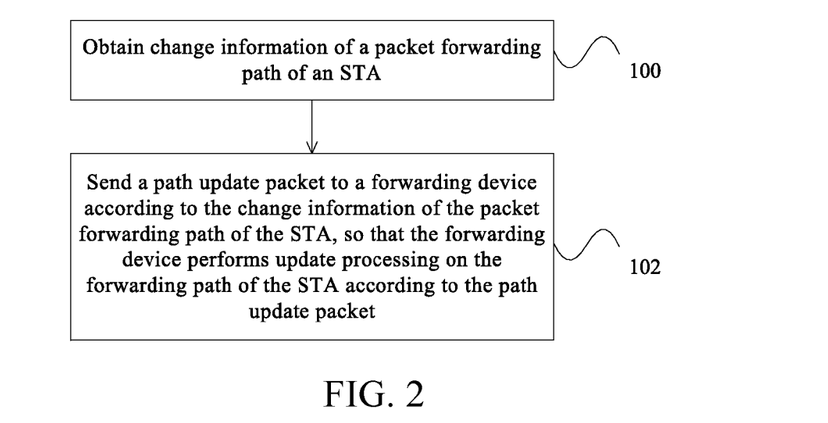
FIG. 2 is a schematic flowchart of a service packet forwarding and processing method according to an embodiment of the present invention.

FIG. 2 is a schematic flowchart of a service packet forwarding and processing method according to an embodiment of the present invention. As illustrated in FIG. 2, the method may include the following steps.

100. Obtain change information of a packet forwarding path of a mobile terminal (Station, abbreviated as STA).

Specifically, the STA accesses a WLAN by using an access point AP, and sends a service packet to a second device by using the access point AP via a forwarding device. After a change occurs on a packet forwarding path of the STA and the second device, the access point AP obtains change information of the packet forwarding path of the STA. Specifically, an access point AP that is currently associated with the STA obtains the change information of the packet forwarding path of the STA.

102. Send a path update packet to a forwarding device according to the change information of the packet forwarding path of the STA, so that the forwarding device performs update processing on the forwarding path of the STA according to the path update packet.

Specifically, the path update packet includes an address of the STA. after the change information of the packet forwarding path of the STA is obtained by using the AP, the AP simulates the STA to send the path update packet including the address of the STA to the forwarding device, so that the forwarding device may learn, on a new port corresponding to a new packet forwarding path, the address of the STA, thereby implementing update processing on the forwarding path of the STA.

Further, the path update packet may be an Address Resolution Protocol (abbreviated as ARP) packet or a Reverse Address Resolution Protocol (abbreviated as RARP) packet. The specific description is as follows:

When an IP address of the STA exists on the AP, the AP simulates the STA to send an ARP packet to the forwarding device, where the ARP packet includes an Internet Protocol (abbreviated as IP) address and a media access control (abbreviated as MAC) address of the STA, so that the forwarding device performs update processing on an ARP table and a MAC table of the forwarding device according to the ARP packet, thereby updating the forwarding path between the STA and the second device. Correspondingly, the AP supports a Dynamic Host Configuration Protocol (abbreviated as DHCP) snooping function for maintaining the IP address of the STA on the AP.

When the IP address of the STA exists on the AP, the AP simulates the STA to sends an RARP packet to the forwarding device, where the RARP packet includes a MAC address of the STA, so that the forwarding device performs update processing on a MAC table of the forwarding device according to the RARP packet, thereby updating the forwarding path of the STA and the second device.

The service packet processing method according to this embodiment of the present invention is described in detail as follows with reference to two specific scenarios.

Figure 3:
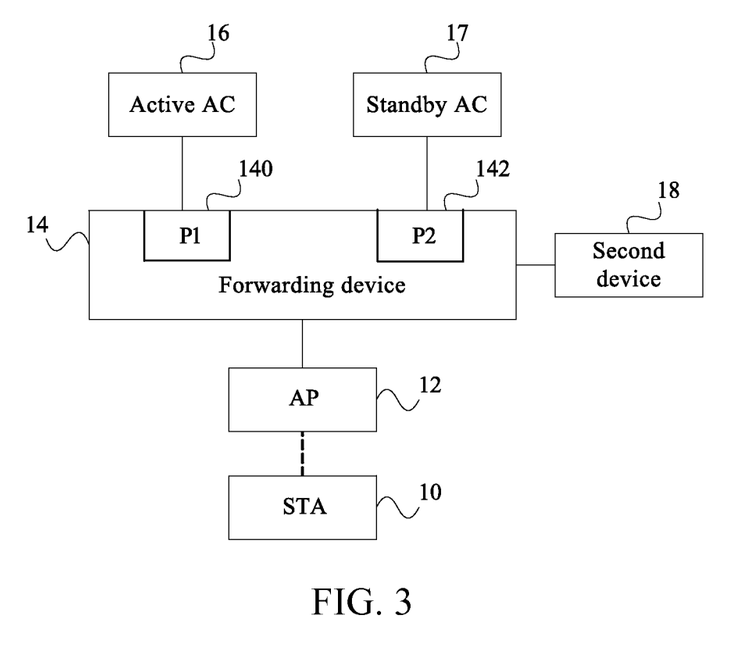
FIG. 3 is a schematic diagram of network architecture where active and standby ACs are deployed for dual-link backup according to an embodiment of the present invention.

In one scenario, active and standby ACs are deployed for dual-link backup, and a tunnel forwarding manner is used. In such cases, an AP is simultaneously connected to an active AC and a standby AC to implement dual-link backup. A packet needs to be forwarded by using an AC. Therefore, when a switchover occur between the active and standby ACs, a change is caused to a packet forwarding path of an STA. FIG. 3 is a schematic diagram of network architecture where active and standby ACs are deployed for dual-link backup according to an embodiment of the present invention. As illustrated in FIG. 3, an AP 12 is simultaneously connected to an active AC 16 and a standby AC 17. At the beginning, a packet forwarding path from an STA 10 to a second device 18 is STA 10-AP 12-forwarding device 14-port P1 140-active AC 16-port P1 140-forwarding device 14-second device 18. Once the active AC 16 fails, resulting in a switchover between the active and standby ACs, the packet forwarding path changes from STA 10-AP 12-forwarding device 14-port P1 140-active AC 16-Port P1 140-forwarding device 14-second device 18 into STA 10-AP 12-forwarding device 14-port P2 142-standby AC 17-port P2 142-forwarding device 14-second device 18. If, in such cases, a packet sent by the second device 18 to the STA 10 still travels along the original path and is forwarded over the port P1 140 to the active AC 16, because the active AC 16 fails, the packet cannot reach the STA 10. The reason thereof lies in that a destination address according to which the second device 18 sends the packet to the STA 10, that is, the address of the STA, still corresponds to the port P1 140, but is not promptly updated to correspond to the port P2 142. In such cases, the service packet processing method illustrated in FIG. 2 of the present invention is used, where the AP 12 associated with the STA 10 obtains change information of the packet forwarding path of the STA 10, and then the AP 12 simulates, according to the change information of the packet forwarding path, the STA 10 to send a path update packet to the forwarding device 14, so that the forwarding device 14 performs update processing on the forwarding path of the STA 10 according to the path update packet. Further, in the process that the AP 12 simulates the STA 10 to send the path update packet to the forwarding device 14, specifically, the AP 12 firstly sends the path update packet encapsulated over a CAPWAP tunnel to the standby AC 17; the standby AC 17 performs tunnel decapsulation to obtain the path update packet, and sends the path update packet to the port P2 142 of the forwarding device; and the port P2 142 receives the path update packet and learns the address of the STA included in the path update packet, thereby updating the packet forwarding path.

Figure 4:
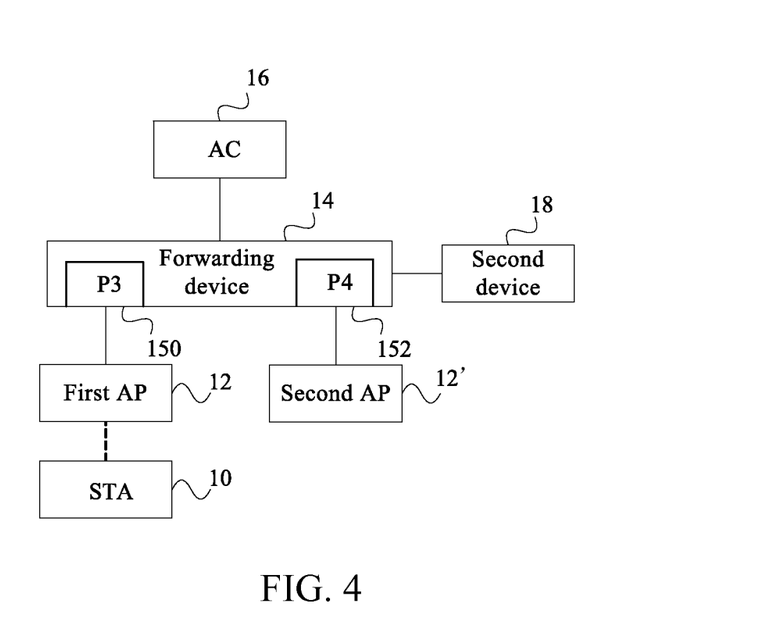
FIG. 4 is a schematic diagram of network architecture in a roaming state according to an embodiment of the present invention.

In another scenario, the STA roams. When the STA roams and moves in a process of communicating with a second device, for example, the STA may move from an AP 1 to an AP 2 and access a WLAN network after association. In a local forwarding manner, a packet forwarding path from the STA to the second device is changed from STA-AP 1-forwarding device-second device into STA-AP 2-forwarding device-second device. In a tunnel forwarding manner, a packet forwarding path from the STA to the second device is changed from STA-AP 1-forwarding device-AC-forwarding device-second device into STA-AP 2-forwarding device-AC-forwarding device-second device. It is obvious that the path from the STA to the forwarding device is changed in either the local forwarding manner or the tunnel forwarding manner. FIG. 4 is a schematic diagram of network architecture in a roaming state according to an embodiment of the present invention. As illustrated in FIG. 4, after an STA 10 roams from a first AP 12 to a second AP 12', a packet forwarding path from the STA 10 to a forwarding device 14 is changed from STA 10-first AP 12-port P3 150-forwarding device 14 into STA 10-second AP 12'-port P4 152-forwarding device 14. After the STA 10 roams to the second AP 12', if the second device 18 sends a packet to the STA 10, because an address of the STA 10 on the forwarding device 14 still corresponds to the port P3 150, the packet still travels along the original path and is forwarded to the first AP 12 over the port P3 150, and cannot reach the STA 10. In such cases, the service packet processing method illustrated in FIG. 2 of the present invention is used, where the second AP 12' associated with the STA 10 obtains change information of the packet forwarding path of the STA 10, and then the second AP 12' simulates, according to the change information of the packet forwarding path, the STA 10 to send a path update packet to the forwarding device 14, so that the forwarding device 14 performs update processing on the forwarding path of the STA 10 according to the path update packet. Further, in a process of simulating the STA 10 to send the path update packet to the forwarding device 14, because the path update packet is received on the port P2 152, the second AP 12' may learn the address of the STA 10 included in the path update packet, thereby updating the forwarding path.

Specifically, when a switchover occurs between the active and standby ACs or the STA roams, the AP may send a path update packet to the forwarding device according to change information of the packet forwarding path, that is, simulate the STA to send a packet to the forwarding device, thereby updating correspondence between a port corresponding to the original packet forwarding path and the address of the STA on the forwarding device into a mapping between a port corresponding to the new packet forwarding path and the address of the STA. Specifically, in a service dual-link state, a port connected to the active AC on the forwarding device is updated into a port connected to the standby AC on the forwarding device; and in a roaming state, a port of the forwarding device connected to the first AP is updated into a port of the forwarding device connected to the second AP.

In the service packet forwarding and processing method according to this embodiment of the present invention, an AP obtains change information of a packet forwarding path of an STA, and then the AP sends a path update packet to a forwarding device according to the change information of the packet forwarding path, so that the forwarding device performs update processing on the forwarding path of the STA according to the path update packet, thereby improving service forwarding efficiency and ensuring service reliability.

Further, in a scenario where active and standby ACs are deployed for dual-link backup and a tunnel forwarding manner is used, the obtaining change information of a packet forwarding path of an STA specifically is: obtaining path switching information of a switchover between an active AC and a standby AC. Specifically, the AP may obtain path switching information of a switchover between an active AC and a standby AC in two manners.

Manner 1: The AP senses and obtains path switching information of a switchover between an active AC and a standby AC.

Specifically, the AP may set up a CAPWAP channel with the active AC and the standby AC each, and determines whether the active AC fails, by periodically detecting a handshake packet with the ACs. Specifically, as illustrated in FIG. 3, the AP 12 sets up a CAPWAP channel with the active AC 16 and the standby AC 17 each. The AP 12 periodically detects a handshake packet; if the active AC 16 fails, the AP 12 may actively sense a switchover between the active AC 16 and the standby AC 17 by using a detection timeout mechanism; and then the AP 12 instructs, in a handshake packet to the standby AC 17, the standby AC 17 to change a state of the standby AC 17 to active.

Manner 2: The AP receives a path switching notification packet sent by an active AC or a standby AC, and then obtains path switching information of a switchover between the active AC and the standby AC according to the path switching notification packet.

Specifically, after a switchover occurs between the active and standby ACs, the active AC or the standby AC may send a path switching notification packet to the AP, thereby notifying the AP of the active/standby switchover. Specifically, as illustrated in FIG. 3, when a switchover occurs between the active AC 16 and the standby AC 17, the active AC 16 or the standby AC 17 sends a path switching notification packet to the AP 12; the AP 12, after receiving the path switching notification packet, obtains path switching information of the switchover between the active AC 16 and the standby AC 17.

In the service packet forwarding and processing method according to this embodiment of the present invention, an AP may sense and obtain path switching information of a switchover between an active AC and a standby AC, or an AP receives a path switching notification packet sent by an active AC or a standby AC, and obtains path switching information of a switchover between the active AC and the standby AC according to the path switching notification packet, thereby obtaining change information of a packet forwarding path of an STA; then, the AP sends a path update packet to a forwarding device, so that the forwarding device performs update processing on the forwarding path of the STA according to the path update packet, thereby improving service forwarding efficiency and ensuring service reliability.

Further, in a roaming state of an STA, the obtaining change information of a packet forwarding path of an STA specifically includes: receiving, by the AP, a roaming success notification packet sent by the AC; and obtaining the change information of the packet forwarding path of the STA according to the roaming success notification packet.

Specifically, as illustrated in FIG. 4, when the STA 10 roams to the second AP 12' successfully, that is, the STA 10 is successfully associated with the second AP 12', the AC 16 sends a roaming success notification packet to the second AP 12'; the second AP 12', upon receipt of the roaming success notification packet, may obtain change information of a packet forwarding path of the STA. After the STA 10 roams successfully, the packet forwarding path of the STA 10 is changed; the AP associated with the STA 10 after the roaming, that is, the second AP 12', obtains the change information of the packet forwarding path of the STA 10.

In the service packet forwarding and processing method according to this embodiment of the present invention, an AP receives a roaming success notification packet sent by an AC; and the AP obtains change information of a packet forwarding path of an STA according to the roaming success notification packet, and then sends a path update packet to a forwarding device according to the change information of the packet forwarding path, so that the forwarding device performs update processing on the forwarding path of the STA according to the path update packet, thereby improving service forwarding efficiency and ensuring service reliability.

Figure 5:
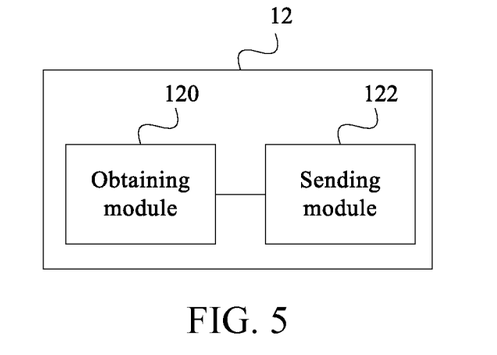
FIG. 5 is a schematic structural diagram of an AP according to an embodiment of the present invention.

FIG. 5 is a schematic structural diagram of an AP according to an embodiment of the present invention, which is configured to implement the service packet processing method illustrated in FIG. 2 of the present invention. As illustrated in FIG. 5, the access point AP includes an obtaining module 120 and a sending module 122.

The obtaining module 120 is configured to obtain change information of a packet forwarding path of an STA.

The sending module 122 is configured to send a path update packet to a forwarding device according to the change information of the packet forwarding path of the STA, so that the forwarding device performs update processing on the forwarding path of the STA according to the path update packet.

The path update packet includes an address of the STA, and the path update packet may be an ARP packet or an RARP packet.

Alternatively, the sending module 122 is specifically configured to, when an IP address of the STA is available on the AP, send an ARP packet to the forwarding device, where the ARP packet includes an IP address and a MAC address of the STA, so that the forwarding device performs update processing on an ARP table and a MAC table of the forwarding device according to the ARP packet. Correspondingly, the AP further includes a DHCP snooping module configured to maintain the IP address of the STA on the AP.

The sending module 122 is further specifically configured to, when an IP address of the STA is unavailable on the AP, send an RARP packet to the forwarding device, where the RARP packet includes a MAC address of the STA, so that the forwarding device performs update processing on a MAC table of the forwarding device according to the RARP packet.

In a scenario where active and standby ACs are deployed for dual-link backup and a tunnel forwarding manner is used, the obtaining module 120 is specifically configured to obtain path switching information of a switchover between the active AC and the standby AC. Further, the obtaining module 120 is specifically configured to actively sense and obtain path switching information of a switchover between the active AC and the standby AC, or specifically configured to receive a path switching notification packet sent by the active AC or the standby AC, and obtain path switching information of a switchover between the active AC and the standby AC according to the path switching notification packet. Further, as illustrated in FIG. 3 and FIG. 5, the path update packet sent by the sending module 122 needs to experience CAPWAP tunnel encapsulation. Alternatively, the sending module 122 includes a tunnel encapsulating unit 1221 configured to perform CAPWAP encapsulation on the path update packet. The sending module 122 sends the encapsulated path update packet to the standby AC 17 via the forwarding device 14. The standby AC 17 performs tunnel decapsulation to obtain an ARP packet or an RARP packet, then, if the path update packet is an ARP packet, sends the ARP packet to the port P2 142 of the forwarding device 14, thereby updating an ARP table and a MAC table on the forwarding device 14 for matching the MAC address and the IP address of the STA 10 with the port P2 142; or if the path update packet is an RARP packet, sends the RARP packet to the port P2 142 of the forwarding device 14, so that the forwarding device 14 updates a MAC table for matching the MAC address of the STA 10 with the port P2 142. As illustrated in FIG. 3, before a switchover occurs between the active AC 16 and the standby AC 17, the address of the STA 10 corresponds to the port P1 140 of the forwarding device 14; the forwarding device 14, upon receipt of the ARP packet, updates the original port P1 140 corresponding to the address of the STA 10 in the ARP table and/or MAC table into the port P2 142 of the forwarding device 14.

In a scenario where an STA roams, the obtaining unit 120 is specifically configured to receive a roaming success notification packet sent by an AC, and obtain change information of a packet forwarding path of the STA according to the roaming success notification packet. Then, the sending module 122 sends a path update packet to a forwarding device according to the change information of the packet forwarding path of the STA, so that the forwarding device performs update processing on the forwarding path of the STA according to the path update packet. As illustrated in FIG. 4, before the STA 10 roams, the port P3 150 connected to the AP 12 on the forwarding device 14 corresponds to the address of the STA 10. After the successful roaming, the STA 10 is associated with the AP 12'; and an obtaining module 120 of the AP 12' receives a roaming success notification packet sent by the AC 16, and obtain change information of the packet forwarding path of the STA 10 according to the roaming success notification packet; then, a sending module 122 of the AP 12' simulates the STA 10 to send a path update packet to the forwarding device 14, so that the forwarding device 14 matches the address of the STA 10 with the port P4 152. For example, the path update packet is an ARP packet, and the forwarding device 14 receives the ARP packet that includes the address of the STA 10 and is sent by the AP 12' from the port P4 152, performs learning, and then updates the port corresponding to the address of the STA 10 in an ARP table and a MAC table into the port P4 152.

According to the access point AP provided in this embodiment of the present invention, the sending module 122 sends a path update packet to a forwarding device according to change information of a packet forwarding path of an STA obtained by the obtaining module 120, so that the forwarding device performs update processing on the forwarding path of the STA according to the path update packet, thereby improving service forwarding efficiency and ensuring service reliability.

Figure 6:
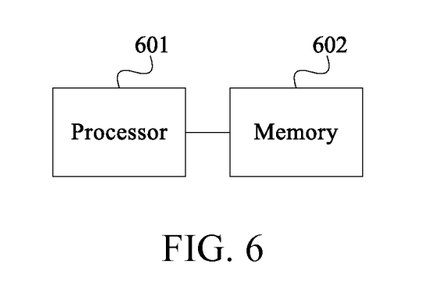
FIG. 6 is a schematic structural diagram of another AP according to an embodiment of the present invention.

FIG. 6 is a schematic structural diagram of another AP according to an embodiment of the present invention. The AP includes a processor 601 and a memory 602, where the processor 601 and the memory 602 may be connected by using a bus or by other means. A bus is used as an example in FIG. 6. The memory 602 has a program code stored therein, where the program code includes a computer operation instruction. The processor 601 executes the program code, and is configured to obtain change information of a packet forwarding path of an STA, and send a path update packet to a forwarding device according to the change information of the packet forwarding path, so that the forwarding device performs update processing on the packet forwarding path of the STA according to the path update packet.

The path update packet includes an address of the STA, and the path update packet may be an ARP packet or an RARP packet.

Under network architecture where dual-link backup is performed when active and standby ACs are deployed, the processor 601 may obtain the change information of the packet forwarding path of the STA in two manners.

In a scenario where active and standby ACs are deployed for dual-link backup and a tunnel forwarding manner is used, the processor 601 is configured to obtain the change information of the packet forwarding path of the STA, which specifically is obtaining path switching information of a switchover between an active AC and a standby AC, and includes the following manners.

Manner 1: The processor 601 is specifically configured to obtain path switching information of a switchover between an active AC and a standby AC. Specifically, an AP may set up a CAPWAP channel with the active AC and the standby AC each; and the processor 601 is configured to periodically detect a handshake packet with the ACs, and actively sense whether the active AC fails by using a detection timeout mechanism, thereby learning path switching information of a switchover between the active AC and the standby AC.

Manner 2: The processor 601 is specifically configured to receive a path switching notification packet sent by an active AC or a standby AC, and then obtain path switching information of a switchover between the active AC and the standby AC according to the path switching notification packet.

In a scenario where an STA roams, the processor 601 is specifically configured to receive a roaming success notification packet sent by an AC, and obtain change information of a packet forwarding path of the STA according to the roaming success notification packet.

The sending, by the processor 601, a path update packet to a forwarding device may be implemented in two manners.

In manner 1, the processor 601 is specifically configured to send an ARP packet to the forwarding device, so that the forwarding device performs update processing on an ARP table and a MAC table of the forwarding device according to the ARP packet. The ARP packet includes an IP address and a MAC address of the STA. Correspondingly, the processor 601 further performs Dynamic Host Configuration Protocol (abbreviated as DHCP) snooping for maintaining the IP address of the STA on the AP.

Specifically, when the IP address of the STA is available on the AP, the processor 601 simulates the STA to send an ARP packet to the forwarding device, where the ARP packet includes the IP address and the MAC address of the STA, so that the forwarding device updates its own ARP table and MAC table, thereby updating the packet forwarding path from the STA to the second device. In manner 2, the processor 601 is specifically configured to send an RARP packet to the forwarding device, so that the forwarding device performs update processing on a MAC table of the forwarding device according to the RARP packet. The RARP packet includes a MAC address of the STA.

Specifically, when the IP address of the STA is unavailable on the AP, the processor 601 simulates the STA to send an RARP packet to the forwarding device, where the RARP packet includes a MAC address of the STA, so that the forwarding device updates its MAC table, thereby updating the packet forwarding path from the STA to the second device.

Moreover, in a scenario where active and standby ACs are deployed for dual-link backup and a tunnel forwarding manner is used, as illustrated in FIG. 3, the processor 601 of the AP 12 is further configured to send a path update packet experiencing CAPWAP tunnel encapsulation to the standby AC 17, so that the standby AC 17 performs tunnel decapsulation to obtain the path update packet, and sends the path update packet to the port P2 142 of the forwarding device.

Alternatively, the memory 602 is further configured to store the address of the STA, including an IP address and a MAC address.

According to the access point AP provided in this embodiment of the present invention, the processor 601 obtains change information of a packet forwarding path of an STA and sends a path update packet to a forwarding device according to the change information of the packet forwarding path, so that the forwarding device performs update processing on the forwarding path of the STA according to the path update packet, thereby improving service forwarding efficiency and ensuring service reliability.

Figure 7:
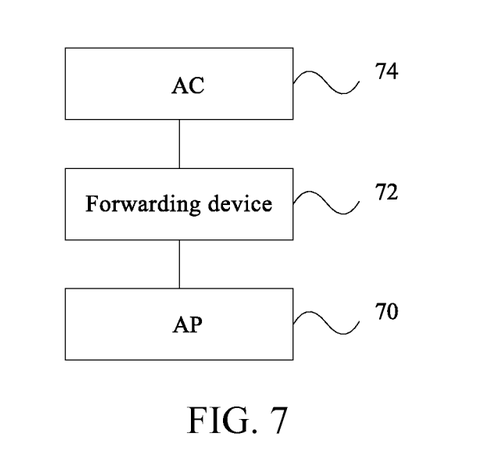
FIG. 7 is a schematic structural diagram of a service packet processing system according to an embodiment of the present invention.

FIG. 7 is a schematic structural diagram of a service packet processing system according to an embodiment of the present invention. The system includes the AP illustrated in FIG. 5 or FIG. 6 and an AC, and may further include a forwarding device, where the forwarding device may be a switch, an edge router, and the like.

The AC 74 is configured to, in the case of dual-link backup, send path switching information of a switchover between an active AC and a standby AC to the AP, and is further configured to, in a scenario where an STA roams, send a roaming success notification packet to the AP; and in a scenario where dual-link backup is performed and a tunnel forwarding manner is used, further configured to receive a path update packet encapsulated over a CAPWAP tunnel and is sent by the AP, perform tunnel decapsulation to obtain the path update packet, and send the encapsulated path update packet to the forwarding device.

The forwarding device 72 is configured to, in a scenario where dual-link backup is performed and a tunnel forwarding manner is used, receive the path update packet that is sent by the AC and experiences tunnel decapsulation, so that a corresponding port on the forwarding device learns an address of the STA; and in a scenario where an STA roams, receive a path update packet sent by an AP associated with the STA after the roaming, so that a corresponding port on the forwarding device learns an address of the STA.

The AP 70 may implement the service packet processing method illustrated in FIG. 2 of the present invention.

The service packet processing system according to this embodiment is capable of producing the effects of the method embodiment illustrated in FIG. 2, which are not described repeatedly herein.

A person of ordinary skill in the art may understand that all or a part of the steps in each of the foregoing method embodiments may be implemented by a program instructing relevant hardware. The aforementioned program may be stored in a computer readable storage medium. When the program runs, the steps of the forgoing methods in the embodiments are performed. The storage medium includes any medium that is capable of storing program codes, such as a ROM, a RAM, a magnetic disk, or an optical disk.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. A service packet forwarding and processing method in a wireless local area network (WLAN), comprising:
   obtaining, by an access point (AP), change information of a packet forwarding path of a mobile terminal that accesses the WLAN using the AP, wherein the change information is obtained from a path switching notification packet or a roaming success notification packet sent by an access controller; and
   simulating, by the AP, in response to obtaining the change information of the packet forwarding path of the mobile terminal, and without triggering by a packet sent from the mobile terminal, the mobile terminal to send an Address Resolution Protocol (ARP) packet to a forwarding device, so that the forwarding device updates an ARP table and a media access control (MAC) table according to the ARP packet, wherein the ARP packet comprises an Internet Protocol (IP) address of the mobile terminal and a MAC address of the mobile terminal.

2. The method according to claim 1, wherein obtaining the change information of the packet forwarding path of the mobile terminal comprises obtaining, in a tunnel forwarding manner, path switching information of a switchover between an active access controller and a standby access controller.

3. The method according to claim 1, wherein obtaining the change information of the packet forwarding path of the mobile terminal comprises:
receiving the roaming success notification packet sent by an access controller.

4. A service packet forwarding and processing method in a wireless local area network (WLAN), comprising:
obtaining, by an access point (AP), change information of a packet forwarding path of a mobile terminal that accesses the WLAN using the AP, wherein the change information is obtained from a path switching notification packet or a roaming success notification packet sent by an access controller; and
simulating, by the AP, in response to obtaining the change information of the packet forwarding path of the mobile terminal, and without triggering by a packet sent from the mobile terminal, the mobile terminal to send a Reverse Address Resolution Protocol (RARP) packet to a forwarding device, so that the forwarding device updates a media access control (MAC) table according to the RARP packet, wherein the RARP packet comprises a MAC address of the mobile terminal.

5. The method according to claim 4, wherein obtaining the change information of the packet forwarding path of the mobile terminal comprises obtaining, in a tunnel forwarding manner, path switching information of a switchover between an active access controller and a standby access controller.

6. The method according to claim 4, wherein obtaining the change information of the packet forwarding path of the mobile terminal comprises:
receiving the roaming success notification packet sent by an access controller.

7. An access point (AP) in a wireless local area network (WLAN), comprising:
a processor; and
memory including code instructions configuring the processor to perform the following:
obtain change information of a packet forwarding path of a mobile terminal that accesses the WLAN using the AP, wherein the change information is obtained from a path switching notification packet or a roaming success notification packet sent by an access controller; and
simulate, in response to obtaining the change information of the packet forwarding path changing of the mobile terminal, and without triggering by a packet sent from the mobile terminal, the mobile terminal to send an Address Resolution Protocol (ARP) packet to a forwarding device, so that the forwarding device performs update processing on an ARP table and a media access control (MAC) table according to the ARP packet, wherein the ARP packet comprises an Internet Protocol IP address of the mobile terminal and a MAC address of the mobile terminal.

8. The AP according to claim 7, wherein the processor is further configured to receive roaming success notification packet sent by an access controller.

9. The AP according to claim 7, wherein the processor is further configured to, in a tunnel forwarding manner, obtain path switching information of a switchover between an active access controller and a standby access controller.

10. An access point (AP) in a wireless local area network (WLAN), comprising:
a processor; and
memory including code instructions configuring the processor to perform the following:
obtain change information of a packet forwarding path of a mobile terminal that accesses the WLAN by using the AP, wherein the change information is obtained from a path switching notification packet or a roaming success notification packet sent by an access controller; and
simulate, in response to obtaining change information of the packet forwarding path of the mobile terminal, and without triggering by a packet sent from the mobile terminal, the mobile terminal to send a Reverse Address Resolution Protocol (RARP) packet to a forwarding device, so that the forwarding device performs update processing on a MAC table according to the RARP packet, wherein the RARP packet comprises a MAC address of the mobile terminal.

11. The AP according to claim 10, wherein the memory also includes code instructions configuring the processor to receive the roaming success notification packet sent by an access controller.

12. The AP according to claim 10, wherein the memory also includes code instructions configuring the processor to, in a tunnel forwarding manner, obtain path switching information of a switchover between an active access controller and a standby access controller.

13. A service forwarding and processing system, comprising:
an access point (AP), in a wireless local area network (WLAN), which is configured to:
obtain change information of a packet forwarding path of a mobile terminal that accesses the WLAN by using the AP, wherein the change information is obtained from a path switching notification packet or a roaming success notification packet sent by an access controller; and
simulate, in response to obtaining change information of the packet forwarding path of the mobile terminal, and without triggering by a packet sent from the mobile terminal, the mobile terminal to send an Address Resolution Protocol (ARP) packet to a forwarding device, so that the forwarding device updates an ARP table and a media access control (MAC) table according to the ARP packet, wherein the ARP packet comprises an Internet Protocol (IP) address of the mobile terminal and a MAC address of the mobile terminal; and
the access controller, which is configured to send the path switching notification packet or the roaming success notification packet to the AP.

14. The system according to claim 13, wherein the system further comprises the forwarding device.

15. A service forwarding and processing system, comprising:
an access point (AP), in a wireless local area network (WLAN), which is configured to:

obtain change information of a packet forwarding path of a mobile terminal that accesses the WLAN by using the AP, wherein the change information is obtained from a path switching notification packet or a roaming success notification packet sent by an access controller; and simulate, in response to obtaining change information of the packet forwarding path of the mobile terminal, and without triggering by a packet sent from the mobile terminal, the mobile terminal to send a Reverse Address Resolution Protocol (RARP) packet to a forwarding device, so that the forwarding device updates a media access control (MAC) table according to the RARP packet, wherein the RARP packet comprises a MAC address of the mobile terminal; and the access controller, which is configured to send a path switching notification packet or a roaming success notification packet to the AP.

16. The system according to claim 15, wherein the system further comprises the forwarding device.

* * * * *